(12) United States Patent
Bingell et al.

(10) Patent No.: US 8,719,794 B2
(45) Date of Patent: *May 6, 2014

(54) FAKE CHECK-IN ENTRIES POSTED ON BEHALF OF SOCIAL NETWORK USERS

(71) Applicant: International Business Machines Corporation, Armonk, NY (US)

(72) Inventors: Nicholas Dayl Bingell, Raleigh, NC (US); Erich Paul Hoppe, Raleigh, NC (US); Andrew Ivory, Wake Forest, NC (US); David Michael Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,088

(22) Filed: Jan. 14, 2013

(65) Prior Publication Data

US 2013/0132483 A1    May 23, 2013

Related U.S. Application Data

(63) Continuation of application No. 13/112,150, filed on May 20, 2011.

(51) Int. Cl.
*G06F 9/44*    (2006.01)

(52) U.S. Cl.
USPC .............................. 717/126; 705/5

(58) Field of Classification Search
USPC .............................. 717/126; 705/5
See application file for complete search history.

(56) References Cited

U.S. PATENT DOCUMENTS

| | | | |
|---|---|---|---|
| 7,856,360 B2 * | 12/2010 | Kramer et al. | 705/1.1 |
| 2003/0093553 A1 | 5/2003 | Le et al. | 709/238 |
| 2005/0050352 A1 | 3/2005 | Narayanaswami et al. | 713/201 |
| 2009/0047972 A1 | 2/2009 | Neeraj | 455/456.1 |
| 2010/0024042 A1 | 1/2010 | Motahari et al. | 726/26 |
| 2010/0077484 A1 | 3/2010 | Paretti et al. | 726/26 |
| 2011/0093340 A1 * | 4/2011 | Kramer et al. | 705/14.58 |

OTHER PUBLICATIONS

Li et al., "Sharing Location in Online Social Networks", 2010.*
Li et al., Analysis of a Location-based Social networks, 2009.*
He et al., "Location Cheating: A Security Challenge to Location-based Social Network Services", Feb. 21, 2011.*
Scellato et al., "Distance Matters: Geo-Social Metrics for Online Social Networks", 2010.*

* cited by examiner

*Primary Examiner* — Phillip H Nguyen
(74) *Attorney, Agent, or Firm* — VanLeeuwen & VanLeeuwen; Jeffrey S. LaBaw

(57) ABSTRACT

An approach is provided in a fake check-in event is received at a software application corresponding to a user of the software application. Fake check-ins are initiated on behalf of the user in response to the fake check-in event. The software application posts a set of fake check-in entries on behalf of the user while the user is away. The posted fake check-ins are visible by other users of the software application and are used to obfuscate others that the user is out-of-town. In one embodiment, check-in entries that are received from the user after fake check-ins have been initiated are cached. In this embodiment, a local check-in event is received when the user is within the user's geographical local area and the cached check-in entries are posted so that they are now visible by the other users of the software application.

14 Claims, 8 Drawing Sheets

FAKE CHECK-IN ENTRIES POSTED ON BEHALF OF SOCIAL NETWORK USERS

BACKGROUND

The present invention relates to an approach that provides virtual location check-in entries at a social network provider using both fake check in entries and caching of check in entries while the user is out of town.

Many social media sites allow users to post their physical location that appears in various pages on the social media site, such as the user's page and the page corresponding to a business or organization at which the user checked in. Users choose to check into a business for a variety of reasons. These reasons include keeping the user's social media "friends" apprised of their whereabouts, increasing the chance of meeting friends at a particular business, and supporting various business by indicating that the user has visited the business. Modern computer networking, such as using the Internet, coupled with modern travel technologies allows users to check in at businesses in various geographic areas, such as different places in a country or throughout the world.

BRIEF SUMMARY

An approach is provided in a fake check-in event is received at a software application corresponding to a user of the software application. Fake check-ins are initiated on behalf of the user in response to the fake check-in event. The software application posts a set of fake check-in entries on behalf of the user while the user is away. The posted fake check-ins are visible by other users of the software application and are used to obfuscate others that the user is out-of-town. In one embodiment, check-in entries that are received from the user after fake check-ins have been initiated are cached. In this embodiment, a local check-in event is received when the user is within the user's geographical local area and the cached check-in entries are posted so that they are now visible by the other users of the software application In a further embodiment, the set of fake check-ins that were posted while the user was away are removed when the user returns so that they are no longer visible to other users of the application. Additionally, the fake check-ins that are posted are, in one embodiment, gathered from the user's prior check in history and are posted at appropriate times and days of the week in order to more fully obfuscate others that the user is out-of-town. In one embodiment, the indicator that the user is out of town is set manually by the user using a control provided by the application. In this embodiment, the second indicator indicating that the user has returned home can also be set manually. In another embodiment, the indicator that the user is out of town is set by receiving a check in entry from the user at an entity, such as a business or organization, that is outside of the user's geographic local area. In this embodiment, the second indicator that indicates that the user has returned home can be set by the user checking into an entity that is within the user's geographic local area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein.

DETAILED DESCRIPTION

Figure 1:
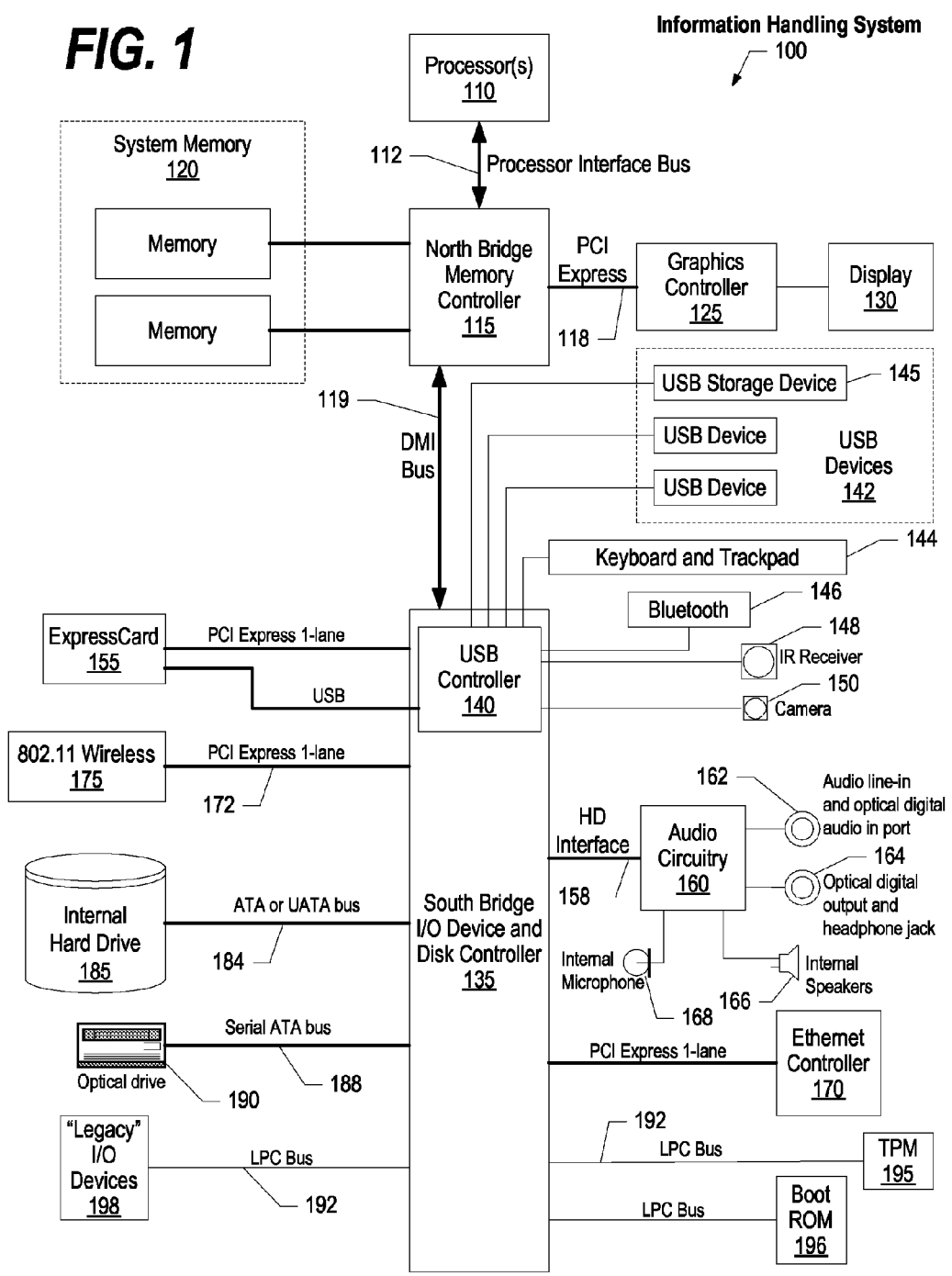
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
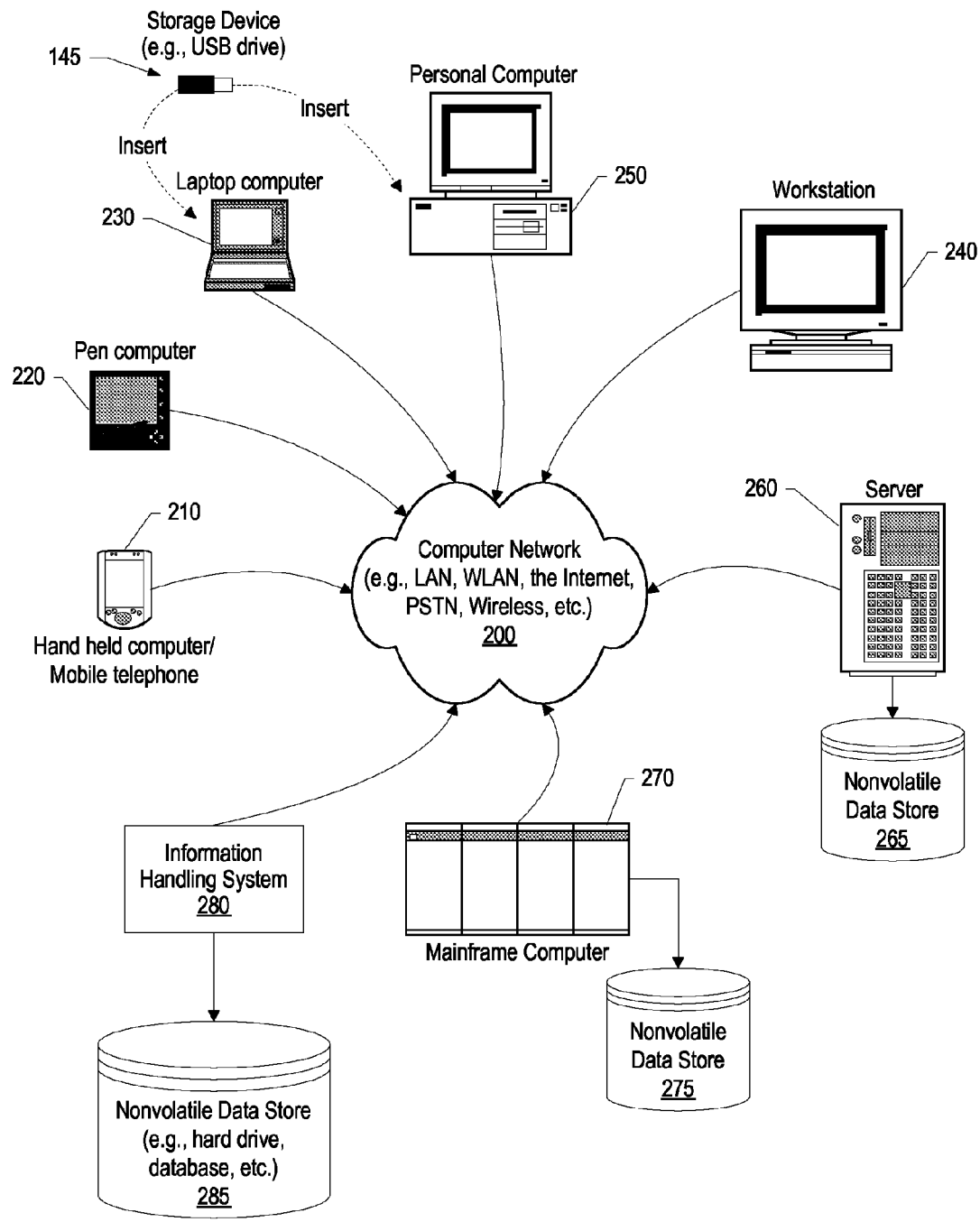
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
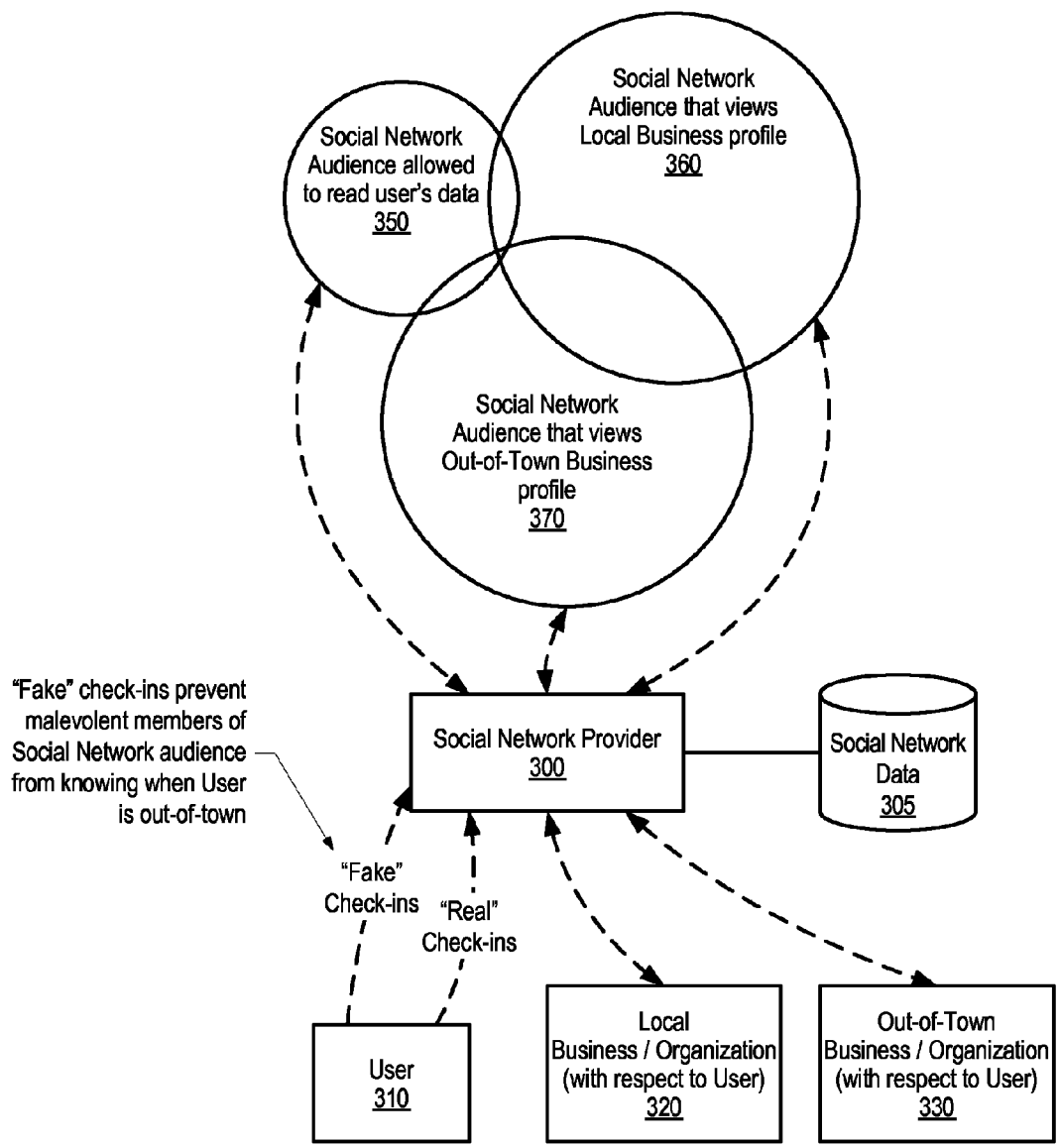
FIG. 3 is a diagram showing various social media participants and how fake check-ins are used to prevent malevolent members of the social media community from knowing when a particular user is out of town.

FIG. 3 is a diagram showing various social media participants and how fake check-ins are used to prevent malevolent members of the social media community from knowing when a particular user is out of town. Social network provider 300 provides facilities, such as a Web site that uses a computer network (e.g., computer network 200 shown in FIG. 2), that allows users to communicate, often informally, with one another. Users include individual users of social network provider 300, such as user 310, that access social networking data, stored by the social network provider, in social network data store 305. Social network data can pertain to individual users (e.g., "friends," "colleagues," etc.) as well as to entities (e.g., businesses, organizations, clubs, etc.).

Mobile computing devices, such as smart phones and the like, can be utilized to "check in" to an entity, such as a business or organization. When a user checks into an entity, a check-in entry is received at the software application, such as at the social network provider's Web site. When a user checks into an entity, the software application posts the check-in on the user's social network page and also at the entities social network page. However, as explained herein, a fake check-in event, such as a check-in at an entity outside of the user's geographic local area, causes the user's check-in entries to be cached rather than immediately posted to the user's social network page and the entity's social network page. When the user returns to their local area, or otherwise triggers a local check-in event, the cached entries are posted to the user's social network page as well as to the entity's social network page. While the user is away, fake check-in entries are posted by the social network software application with these fake check-in entries being visible to other users of the social network provider. These fake check-in entries are posted while the user is out of town in order to obfuscate other users of social network provider 300 from knowing that the user is away from home (and thus vulnerable to having the user's home and/or property burglarized and/or stolen while the user is away). Other users may be members of one or more different social network audiences. In another embodiment, a fake check-in event is received when a certain time period elapses after the user's last check-in event. For example, if the user checks into a business entity, such as a gym, but is injured and taken to a hospital so that an extended period of time elapses (e.g., a day, etc.) since the user's last check-in entry, then the system will automatically initiate fake check-ins to obfuscate the fact that the user is indisposed (e.g., at the hospital, etc.) and is not at home. Audience 350 are associated directly with user 310, such as by being linked to the user through an online friendship or linking process that verifies that the user wishes to allow members of audience 350 with access to user 310's social network data.

By utilizing network facilities, such as the Internet, users can check-in at entities in various geographic locations throughout the world. In this manner, entities can be physically within a geographic local area that corresponds to a particular user (e.g., user 310), and can also be physically outside of the geographic local area that corresponds to the user. For example, if the user's geographic local area (e.g., home) is in Raleigh, N.C., then entities in geographic proximity Raleigh would be deemed within the user's geographic local area. When a user checks in at a Raleigh-area entity, such as a gym located in Raleigh, then a check-in entry is posted on the user's social network page as well as the local entities social network page (e.g., local entity 320). This check-in entry is visible by other users that are members of audience 350 (e.g., friends of user 310) as well by other users that are members of audience 360 (e.g., customers, employees, supporters, etc. of the Raleigh-area gym).

When user 310 travels out of town away from the Raleigh area, then the actual check-in entries received from the user are cached rather than posted and fake check-in entries are posted to obfuscate the fact that the user is out of town. For example, if the user travels to Austin, Tex. and checks in at an Austin-area gym, then social network provider 300 would receive the check-in entry corresponding to the Austin-area gym. Instead of posting the check-in entry at the user's social network page and the out-of-town social network page (e.g., social network page 330), the system caches the received check-in entry and waits until the user has returned home (to Raleigh) before posting the check-in entries. In addition, malevolent users of the social network provider may otherwise realize that the user is not checking into local Raleigh area entities where the user typically frequents. Fake check-in entries are posted at local entities (e.g., the Raleigh-area gym, etc.) so that it appears as though the user is still in the Raleigh area. When the user returns from the trip and is back in the Raleigh area, the cached check-in entries are posted to the user's social network page as well as to the out of town entities pages (e.g., the Austin-area gym, etc.) where the user actually checked in while on the trip to Austin. In addition, in one embodiment, once the user returns home, the fake check-in entries that were posted while the user was out of town are removed from both the user's social network page as well as from the local area entity pages (e.g., from the Raleigh-area gym, etc.).

Figure 4:
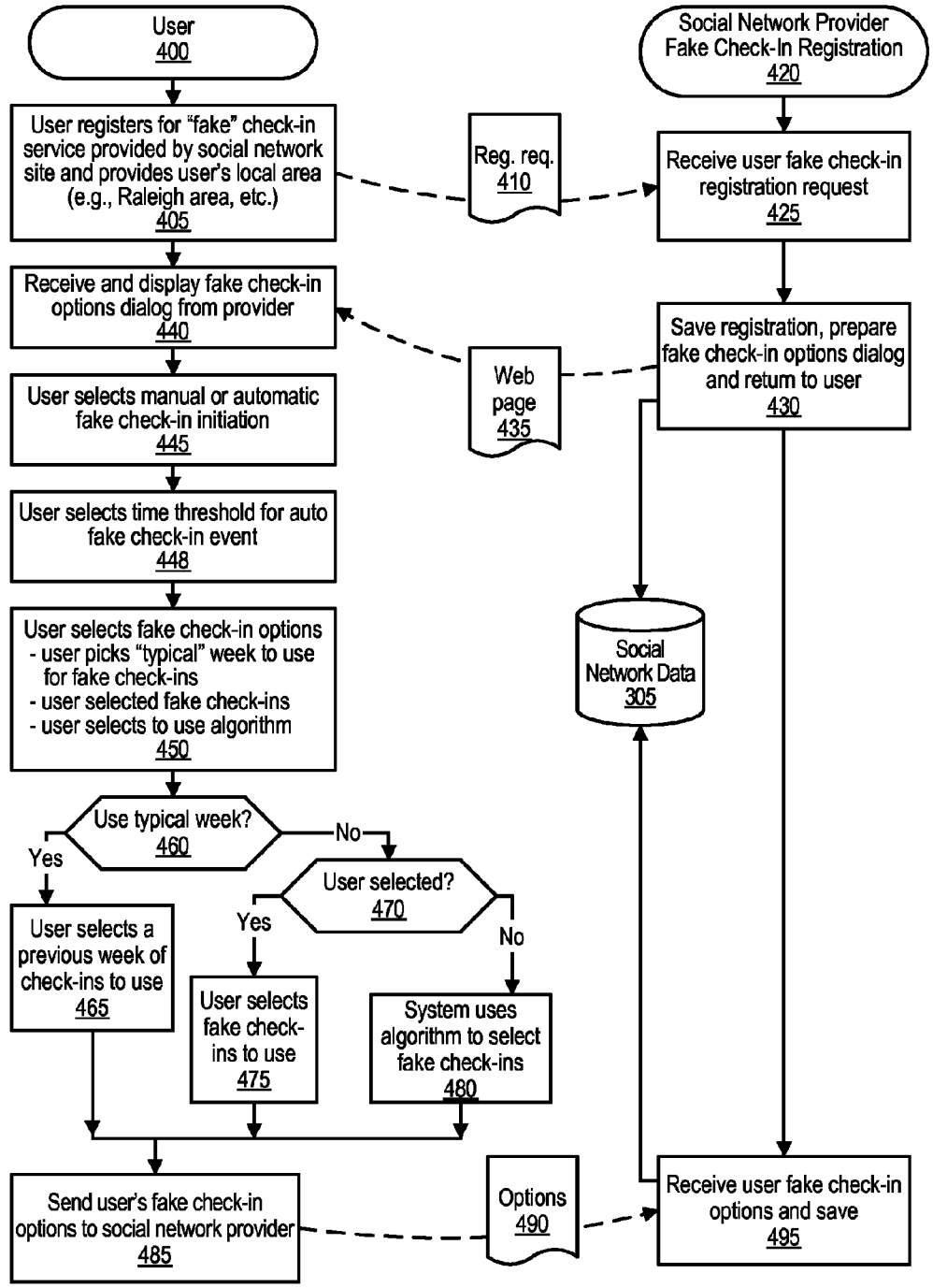
FIG. 4 is a flowchart showing registration steps used by a user to set up fake check-ins at a social media provider.

FIG. 4 is a flowchart showing registration steps used by a user to set up fake check-ins at a social media provider. User processing commences at 400 whereupon, at step 405, the user registers with the social network Web site (software application) for a fake check-in service that is offered by the social network provider. In addition, the user provides a geographic local area (e.g., town name, zip or postal code, GPS coordinates, etc.) that correspond to the user. Registration request 410 is transmitted via a computer network, such as the Internet, after which it is received by the social network provider. Social network provider's processing commences at 420 whereupon, at step 425, the social network provider receives the fake check-in request that was prepared and sent by the user. At step 430, the fake check-in registration is saved in social network data store 305 in a private area, such as a user profile area, that is not accessible by other users of the social network provider. In addition, fake check-in options, as offered by the social network provider, are prepared and transmitted back to the user as Web page 435.

At step 440, the user receives and displays the fake check-in options dialog (e.g., a Web page, etc.) that was transmitted from the social network provider. At step 445, the user selects whether manual or automatic fake check-in initiation is preferred by the user. Manual fake check-in is a process whereby the user informs the social network provider when the user is traveling outside of the user's geographic local area so that fake check-in processing will be initiated for the user by the social network provider. Automatic fake check-in is a process whereby the social network provider analyzes the user's check-in entries and automatically initiates the fake check-in processing when the social network provider senses that the user is outside of the user's geographic local area (e.g., when a check-in entry is received from the user at an entity that is outside the user's geographic local area, etc.). At step 448, the user selects a time threshold to use to initiate an automatic fake check-in event. For example, if the user selects "two days" in step 448, then if a check-in entry is not received from the user within two days, the system automatically triggers a fake check-in event so that fake check-ins are posted on behalf of the user to obfuscate the fact that the user is indisposed or otherwise away and unable to perform check-in entries (e.g., at the hospital, without network access, etc.). At step 450, the user optionally selects a preferred fake check-in option that is used by the social network provider in selecting the fake check-in entries. For example, the user can select a "typical" week of actual check-ins from the user's history that will be used as fake check-in entries when the user is out of town. Alternatively, the user can manually select the fake check-in entries (e.g., entity name, time of day, day of week, etc.) that the user wants to use for the user's fake check-in entries. If the user does not provide a typical week or select the fake check-in entries, then the social network provider can utilize an algorithm where appropriate entities are selected (e.g., based on the user's past check-in history, etc.), along with appropriate days of the week and time of day when the fake check-in entries will be posted.

A decision is made as to whether the user selected to use a typical week of check-in entries from the user's history (decision 460). If the user opted to use a typical week, then decision 460 branches to the "yes" branch whereupon, at step 465, the user selects a previous week of check-in entries to use as fake check-in entries (copying the entity, approximate check-in time, and check-in day of the week). On the other hand, if the user did not opt to use a typical week, then decision 460 branches to the "no" branch whereupon a decision is made as to whether the user opted to manually select the fake check-in entries to use (decision 470). If the user opted to manually select the fake check-in entries, then decision 470 branches to the "yes" branch whereupon, at step 475, the user manually selects the fake check-in entries (the entities, approximate check-in times, and check-in days of the week) to use as fake check-in entries. On the other hand, if the user did not select either a typical week or manual fake check-in entries, then decision 470 branches to the "no" branch whereupon, at step 480, the social network application will use an algorithm to randomly select fake check-in entries that are used based on the user's past check-in history.

At step 485, the user's fake check-in options are transmitted to the social network application via the computer network as options transmittal 490. At step 495, the social network application receives the user's fake check-in options and saves the options in a private area included in social network data store 305.

Figure 5:
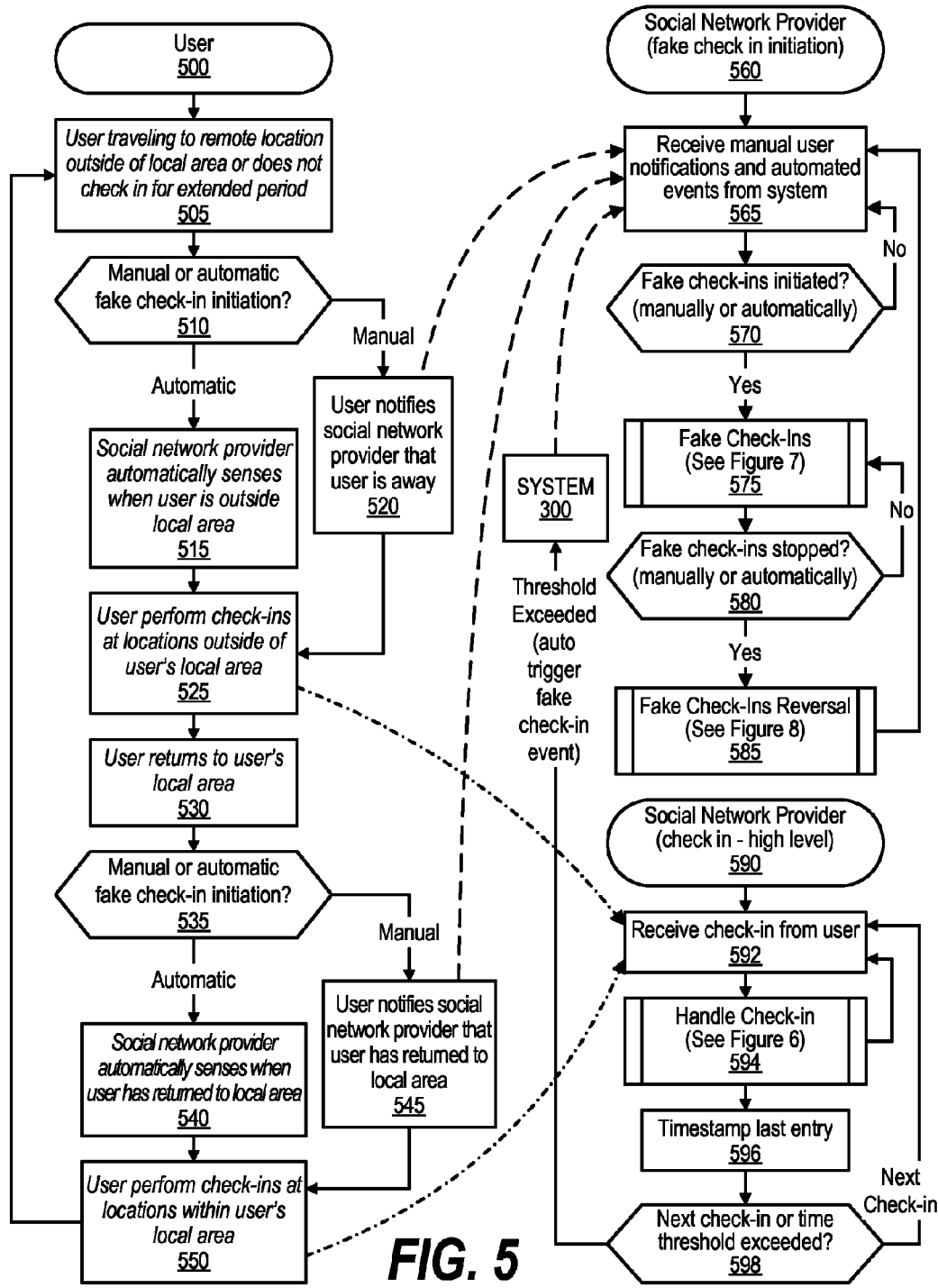
FIG. 5 is a flowchart showing steps between a user and the social media provider to notify when the user is out-of-town and the transmission and reception of check-ins.

FIG. 5 is a flowchart showing steps between a user and the social media provider to notify when the user is out-of-town and the transmission and reception of check-ins. Processing commences at 500 whereupon, at step 505, the user is traveling outside of the user's geographic local area. A decision is made as to whether manual or automatic fake check-in initiation is being used (decision 510). If automatic fake check-in initiation is being used, then decision 510 branches to the branch labeled "automatic" whereupon, at step 515, the social network provider's application software automatically senses when the user is outside of the user's geographic local area (e.g., when a check-in entry is received from the user at an entity that is outside of the user's geographic local area, etc.). On the other hand, if manual fake check-in initiation is being used, then decision 510 branches to the branch labeled "manual" whereupon, at step 520, the user notifies the social network provider that the user is traveling outside of the user's geographic local area.

At step 525, the user performs check-in actions at entities that are outside the user's geographic local area. These check-in actions result in check-in entries being transmitted to the social network provider. At some point, indicated by step 530, the user returns home to the user's geographic local area. A decision is made as to whether manual or automatic fake check-in initiation is being used (decision 535). If automatic fake check-in initiation is being used, then decision 535 branches to the branch labeled "automatic" whereupon, at step 540, the social network provider's application software automatically senses when the user has returned to the user's geographic local area (e.g., when a check-in entry is received from the user at an entity that is within the user's geographic local area, etc.). On the other hand, if manual fake check-in initiation is being used, then decision 535 branches to the branch labeled "manual" whereupon, at step 545, the user notifies the social network provider that the user has returned to the user's geographic local area. At step 550, the user performs check-in at various entities that are within the user's geographic local area. These local check-ins continue until the user once again travels outside of the user's geographic local area, at which point processing loops back to step 505 and the process described above is repeated.

Fake check-in initiation processing that is performed by the social network provider commences at 560 whereupon, at step 565, the social network provider either receives events from both the user and the system. These events can include fake check-in events that are triggered manually by the user or automatically triggered events initiated from the check-in subsystem of the social network application (system 300). A decision is made as to whether fake check-ins (manual or automatic) have been initiated for the user (decision 570). If fake check-ins have been initiated, then decision 570 branches to the "yes" branch whereupon, at predefined process 575, the social network provider's fake check-in process is executed for the user (see FIG. 7 and corresponding text for processing details). On the other hand, if fake check-ins have not been initiated, then decision 570 branches to the "no" branch which loops back to step 565 to get the next notification from either the social network provider (system 300) or from the user.

After fake check-ins have been initiated and predefined process 575 has been executed, a decision is made as to whether fake check-ins have been terminated, either manually or automatically, for the user (decision 580). If fake check-in processing has not been terminated (e.g., the user is still out of town, etc.), then decision 580 branches to the "yes" branch which loops back to continue fake check-in processing using predefined process 575. This looping continues until fake check-ins have been terminated, at which point decision 580 branches to the "yes" branch whereupon, at predefined process 585, fake check-in reversal processing is executed (see FIG. 8 and corresponding text for processing details). After fake check-in reversal process 585 has been performed, processing loops back to step 565 to receive the next manual or automatic notification.

The social network provider's high level check-in process is shown commencing at 590 whereupon, at step 592, the social network provider receives check-in entries from the user at various entities (both within and outside of the user's geographic local area). Predefined process 594 handles the various check-in entries (see FIG. 6 and corresponding text for processing details). In one embodiment, the system can initiate an automatic fake check-in event when a given time period (e.g., a time threshold set by the user, etc.) elapses after the user's last check-in was received. In this embodiment, at step 596, the latest (last) check-in entry received from the user is timestamped. A decision is made as to whether the user's next check-in request arrives before the time threshold expires (decision 598). If the next check-in is received from the user, then decision 598 branches to "next check-in" branch which loops back to process the latest check in as described above and resets the timestamp. On the other hand, if the amount of time since the last check-in was received by the user exceeds the threshold, then decision 598 branches to the "threshold exceeded" branch which triggers the fake check-in event and initiates fake-check in processing on behalf of the user. For example, the user could set the threshold to be "two days" so that if a new check-in entry is not received from the user in a two day period, then the system will automatically initiate the fake check-in processing as described herein.

Social network provider check-in processing continues to loop back to receive further check-in entries from the user and continues to process the check-in entries using predefined process 596.

Figure 6:
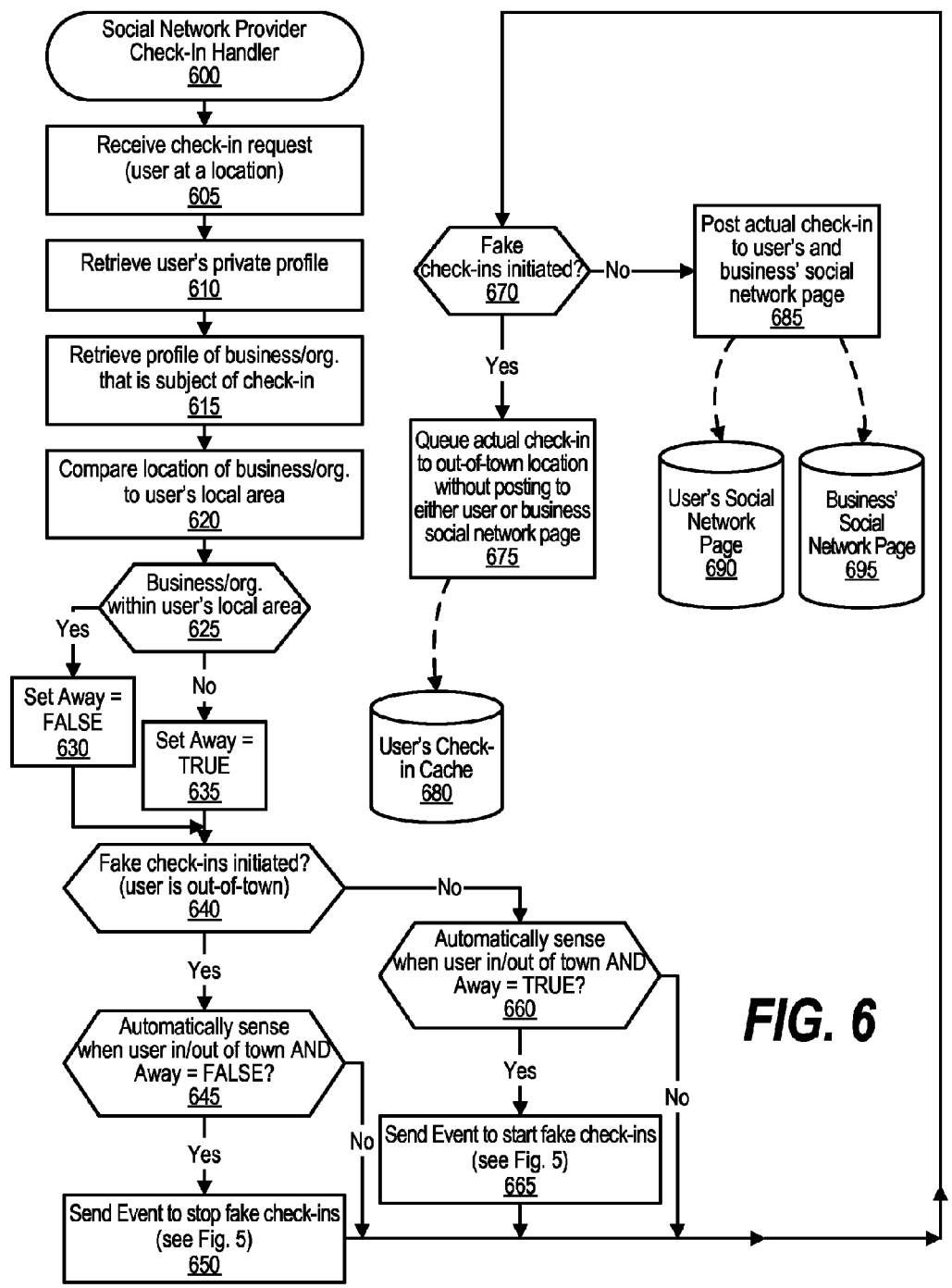
FIG. 6 is a flowchart showing the steps used at the social media provider to handle check-ins received from users.

FIG. 6 is a flowchart showing the steps used at the social media provider to handle check-ins received from users. Check-in processing commences at 600 whereupon, at step 605, a check-in entry (request) is received from the user at a physical entity location (e.g., a gym, a grocery store, etc.). At step 610, the user's private profile that is not accessible by other users of the social network provider is retrieved and, at step 615, a business profile corresponding to the entity at which the user checked in is retrieved. Using data found in the profiles, the location of the entity is compared with the user's geographic local area at step 620. A decision is made as to whether the entity is within the user's geographic local area (decision 625). If the entity is within the user's geographic local area, then decision 625 branches to the "yes" branch whereupon an "away" flag is set to FALSE indicating that the user is not outside of the user's geographic local area. On the other hand, if the entity is outside of the user's geographic local area, then decision 625 branches to the "no" branch whereupon, the "away" flag is set to TRUE indicating that the user is outside of the user's geographic local area. A decision is made as to whether fake check-ins have been initiated indicating that the user is out of town (decision 640). If fake check-ins have been initiated, then decision 640 branches to the "yes" branch whereupon a decision is made as to whether the user has requested to automatically sense when the user is within or outside of the user's geographic local area AND if the "away" flag is FALSE (decision 645). If both conditions are true (the user has requested automatic sensing of the user's in-town/out-of-town status and the and the check-in performed by the user is to a local entity), then decision 645 branches to the "yes" branch whereupon, at step 650, an event is sent to the social network provider (see FIG. 5, step 565) to stop, or terminate, fake check-in processing. On the other hand, if either the user has requested manual initiation of fake check-in processing OR the user is still outside of the user's geographic local area, then decision 645 branches to the "no" branch bypassing step 650.

Returning to decision 640, if fake check-in processing has not been initiated, then decision 640 branches to the "no" branch whereupon a decision is made as to whether the user has requested to automatically sense when the user is within or outside of the user's geographic local area AND if the "away" flag is TRUE (decision 660). If both conditions are true (the user has requested automatic sensing of the user's in-town/out-of-town status and the check-in performed by the user is to an out of town entity), then decision 660 branches to the "yes" branch whereupon, at step 665, an event is sent to the social network provider (see FIG. 5, step 565) to start, or initiate, fake check-in processing. On the other hand, if either the user has requested manual initiation of fake check-in processing OR the user is within of the user's geographic local area, then decision 660 branches to the "no" branch bypassing step 665.

A decision is made as to whether fake check-ins are currently being used for the user (decision 670). If fake check-ins are currently being used for the user, then decision 670 branches to the "yes" branch whereupon, at step 675, the actual check-in to the out of town entity is queued to user's check-in cache 680 instead of posting the check-in to either the user's social network page or to the entity's social network page. On the other hand, if fake check-ins are not currently being used for the user, then decision 670 branches to the "no" branch whereupon, at step 685, the actual check-in entries are posted to both the user's social network page 690 as well as to the entity's social network page 695.

Figure 7:
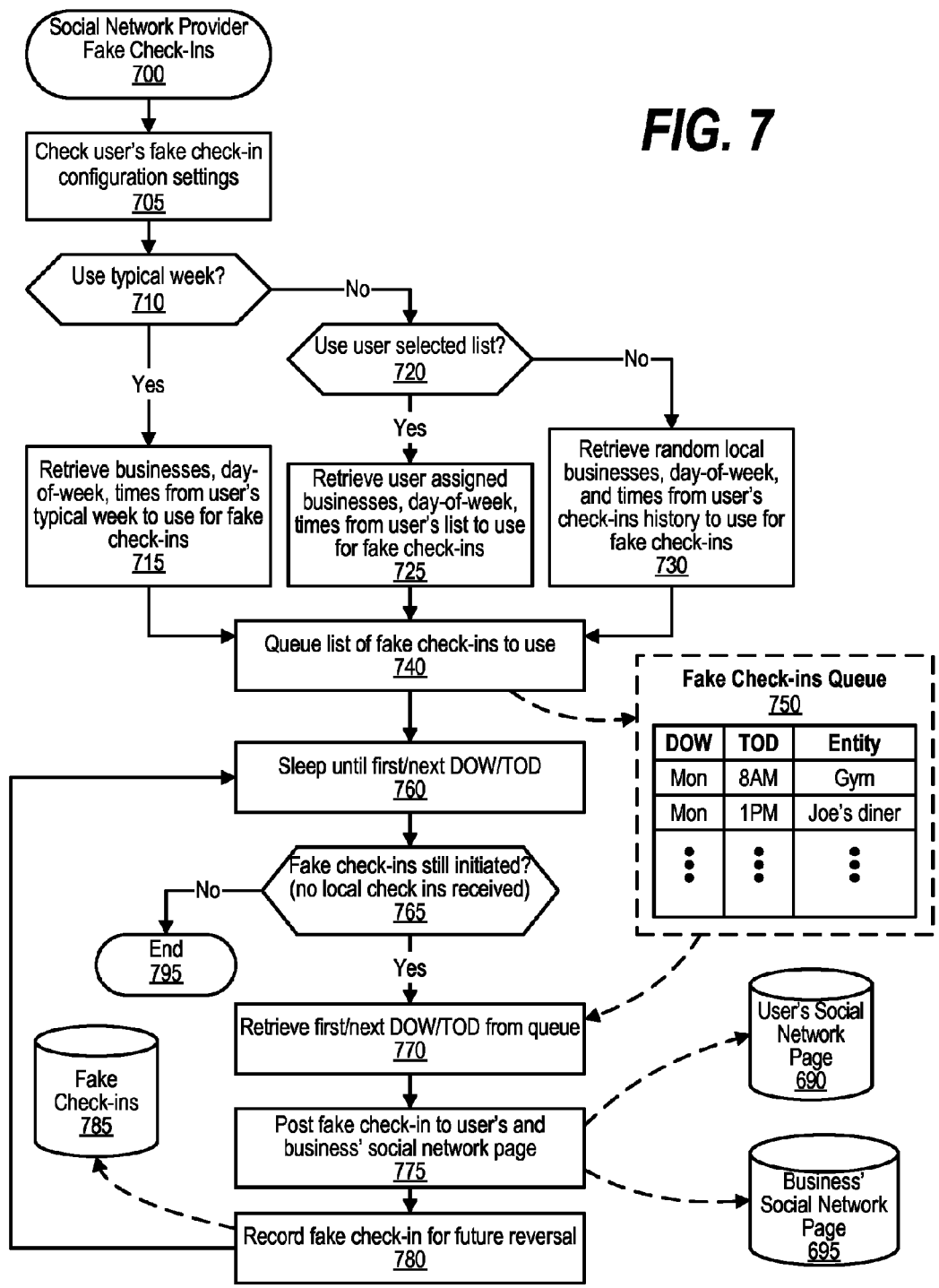
FIG. 7 is a flowchart showing the steps used at the social media provider to perform fake check-ins on behalf of a user that is out-of-town.

FIG. 7 is a flowchart showing the steps used at the social media provider to perform fake check-ins on behalf of a user that is out-of-town. The social network provider's fake check-in processing commences at 700 whereupon, at step 705, the social network provider retrieves the user's fake check-in configuration settings. A decision is made as to whether the user has opted to use a typical week of actual check-in entries as fake check-in entries (decision 710). If a typical week is being used, then decision 710 branches to the "yes" branch whereupon, at step 715, the entities (businesses, organizations, etc.) from the user's selected week are retrieved along with the time of day and day of week to use for the fake check-in entries. On the other hand, if the user did not opt to use a typical week of check-in entries, then decision 710 branches to the "no" branch whereupon a decision is made as to whether the user has opted to use a user selected set of fake check-in entries (decision 720). If the user has opted to use a user selected set of fake check-in entries, then decision 720 branches to the "yes" branch whereupon, at step 725, the user selected entity names are retrieved along with the time of day and day of week to use for the fake check-in entries. On the other hand, if neither a typical week or a user selected list was chosen by the user, then decision 720 branches to the "no" branch whereupon, at step 730, the social network provider automatically retrieves random local entity check-in entries along with the time of day and day of week from the user's history of past actual check-in entries to local entities.

At step 740, the list of fake check-in entries is queued to fake check-ins queue 750. Fake check-ins queue 750 includes fields for the day of the week, the time of day, and the entity name or identifier. At step 760, the fake check-ins process sleeps until the first day of the week and time of day occurs as listed in fake check-in queue 750. When the first day of week and time of day occurs, then a decision is made as to whether fake check-in processing is still being performed for the user (decision 765). If fake check-in processing is still being performed (the user has not returned home yet), then decision 765 branches to the "yes" branch whereupon, at step 770, the entry corresponding to the day of week and time of day is retrieved from fake check-ins queue 750. At step 775, the retrieved fake check-in entry is posted to the user's social network page 690 as well as to the entity's social network page 695. At step 780, the fake check-in is recorded in fake check-in data store 785 where fake check-in data store 785 is an internal data store that is inaccessible from users of the social network provider. Processing then loops back to step 760 whereupon processing sleeps until the next day of week and time of day in the fake check-ins queue is reached. When the next day of week and time of day is reached, the processing as described above is performed. Fake check-in entries continue to be posted until fake check-in processing is terminated, at which point decision 765 branches to the "no" branch and fake check-in processing ends at 795.

Figure 8:
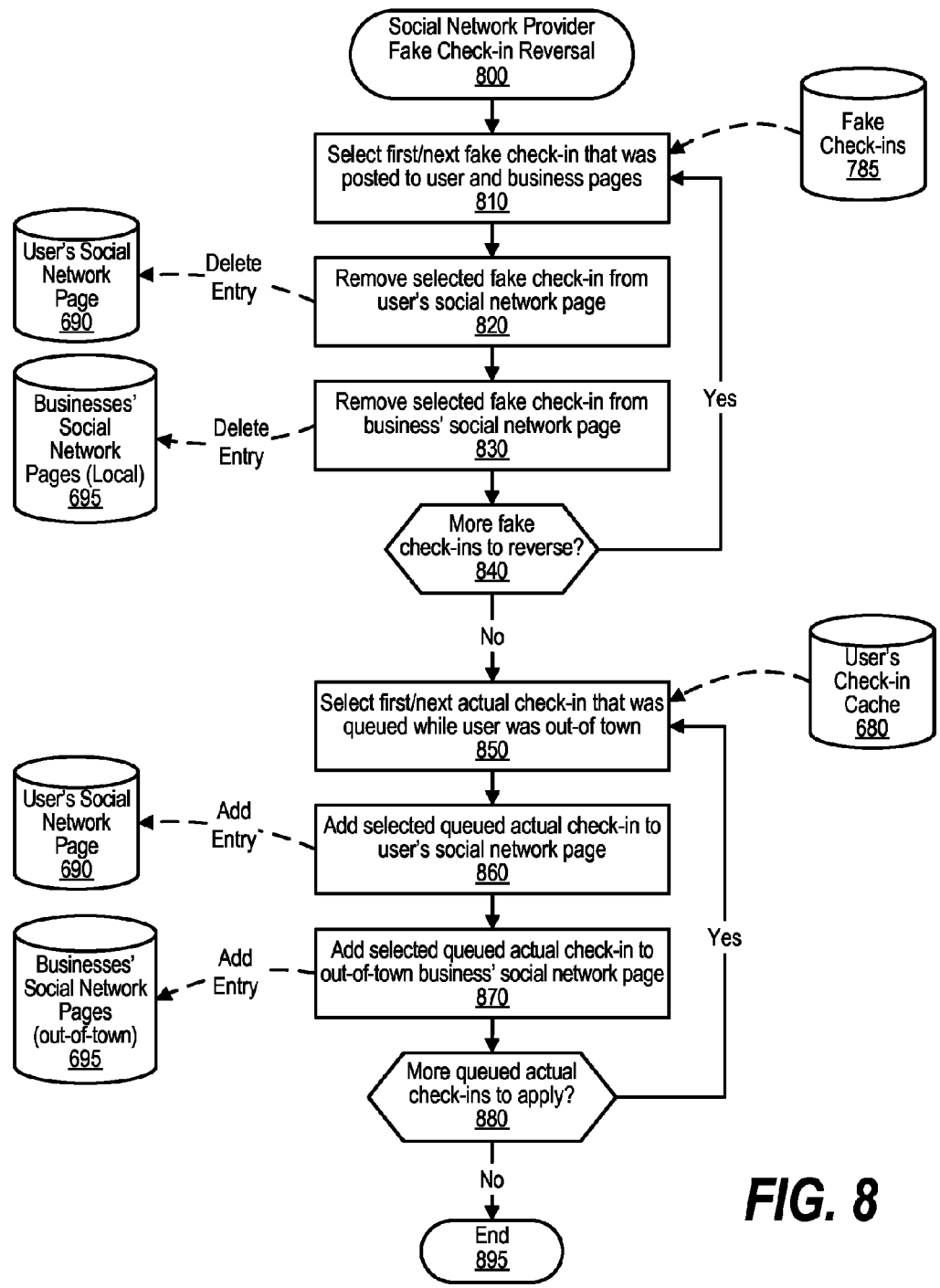
FIG. 8 is a flowchart showing the steps taken at the social media provider to reverse the effects of fake check-ins when the user is no longer out-of-town.

FIG. 8 is a flowchart showing the steps taken at the social media provider to reverse the effects of fake check-ins when the user is no longer out-of-town. The social network provider's fake check-in reversal process commences at 800 whereupon, at step 810, the first recorded fake check-in that was recorded in fake check-ins data store 785 is selected. At step 820, the selected fake check-in is removed (deleted) from the user's social network page 690 and, at step 830, the selected fake check-in is removed (deleted) from the entity's social network page 695. A decision is made as to whether there are more fake check-in entries stored in fake check-ins data store 785 that need to be reversed (decision 840). If there are more fake check-in entries to reverse, then decision 840 branches to the "yes" branch whereupon processing loops back to select and process the next fake check-in entry from fake check-ins data store 785. This looping continues until there are no more fake check-in entries that need to be reversed, at which point decision 840 branches to the "no" branch for further reversal processing.

At step 850, the first check-in to an out-of-town entity that was cached in user's check-in cache 680 is selected. At step 860, the selected entry is posted to the user's social network page 690. At step 870, the selected entry is also posted to the entity's social network page 695. A decision is made as to whether there are more cached check-in entries that need to be processed (decision 880). If there are more cached check-in entries to process, then decision 880 branches to the "yes" branch which loops back to select the next check-in entry that was cached in user's check-in cache 680 and the selected entry is posted to the user's and the entity's social network pages as described above. This looping continues until there are no more cached check-in entries to process, at which point decision 880 branches to the "no" branch and processing ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system comprising:
   receiving a fake check-in event at a social network application, the fake check-in event corresponding to a user of the social network application; and
   initiating fake check-ins on behalf of the user in response to receiving the fake check-in event, wherein initiating the fake check-ins further comprises:
      receiving one or more current check-in entries from the user, the current check-in entries corresponding to one or more current locations of the user;
      in response to the receiving, caching the current check-in entries, wherein the cached current check-in entries are not visible by other users of the social network application; and
      posting, by the social network application, a set of fake check-in entries on behalf of the user, wherein the posted fake check-in entries are visible by other users of the social network application.

2. The method of claim 1 wherein the fake check-in event is selected from a group consisting of an out-of-town check-in by the user, an initiation request received at the social network application from the user, and an elapsed period of time since a last check-in event was received from the user.

3. The method of claim 1 further comprising:
   receiving the one or more current check-in entries from the user while the user is physically outside of a geographic local area that corresponds to the user.

4. The method of claim 3 further comprising:
   receiving a local check-in event at the social network application corresponding to the user of the social network application, wherein the local check-in event indicates that the user is within the geographic local area that corresponds to the user; and
   in response to receiving the local check-in event, posting the cached current check-in entries, wherein the posted current check-in entries are visible by the other users of the social network application.

5. The method of claim 4 further comprising:
   removing the set of fake check-in entries in response to receiving the local check-in event, wherein the removed set of fake check-in entries are no longer visible to the other users of the social network application.

6. The method of claim 1 wherein the fake check-in entries are used to obfuscate the other users of the social network application as to an out-of-town status of the user while the user is physically outside of the geographic local area that corresponds to the user.

7. The method of claim 1 wherein the set of fake check-ins are each flagged as fake check-in entries by the social network application, and wherein the flags of the fake check-ins are not visible by the other users of the social network application.

8. The method of claim 1 further comprising:
   selecting the set of fake check-in entries from a plurality of previous actual check-in entries corresponding to the user, wherein each of the plurality of previous actual check-in entries were check-ins to one or more entities that are physically within the geographic local area corresponding to the user.

9. The method of claim 8 further comprising:
   identifying the set of fake check-in entries from a nonvolatile storage area accessible from the social network application;
   generating a time-of-day and a day-of-week corresponding to each of the set of fake check-in entries, wherein the generated time-of-day and day-of-week are based on a check-in history corresponding to the user; and
   periodically posting individual fake check-in entries from the set of fake check-in entries based upon the time-of-day and day-of-week that corresponds to the posted individual fake check-in entries.

10. The method of claim 9 further comprising:
    recording each of the periodically posted individual fake check-in entries in a fake check-ins data store;
    receiving a local check-in event at the social network application corresponding to the user of the social network application, wherein the local check-in event indicates that the user has returned to the geographic local area that corresponds to the user;
    in response to receiving the local check-in event:
       reading each of the fake check-in entries from the fake check-ins data store;
       matching each of the read fake check-in entries with fake check-in entries previously posted to one or more social network pages; and
       removing each of the matched fake check-in entries from the social network pages.

11. The method of claim 1 further comprising:
    receiving a first manual selection at the social network application from the user, wherein the first manual selection is the fake check-in event;
    in response to the reception of the first manual selection, setting a flag indicating that the user is physically outside of a geographic local area corresponding to the user;
    while the flag is set:
       receiving the one or more current check-in entries from the user; and
       caching the received current check-in entries in a cache area;
    receiving a second manual selection at the social network application from the user, wherein the second manual selection is a local check-in event that indicates that the user has returned to the user's geographic local area; and clearing the flag in response to receiving the second manual selection.

12. The method of claim 1 further comprising:

receiving a check-in request from the user, wherein the check-in request corresponds to an entity;

determining that the entity is physically located outside of a geographic local area that corresponds to the user; and triggering the fake check-in event in response to the determination.

13. The method of claim 1 further comprising:

receiving a check-in request from the user, wherein the check-in request corresponds to an entity;

recording a timestamp corresponding to the received check-in request;

determining that an amount of time has elapsed since the timestamp was recorded, wherein the amount of time exceeds a threshold; and triggering the fake check-in event in response to the determination.

14. The method of claim 1 further comprising:

receiving, at the social network application, a first current check-in entry from the user currently checking into an entity at a physical location;

retrieving, at the social network application, a private profile corresponding to the user, wherein the private profile is inaccessible from the other users of the social network application;

retrieving, from the private profile, a geographic local area corresponding to the user;

retrieving a geographic identity of the entity's physical location;

comparing the user's geographic local area with the entity's geographic identity;

determining, based on the comparison, whether the entity's geographic identity is within the user's geographic local area;

in response to the determination being that the entity's geographic identity is outside of the user's geographic local area:

triggering the fake check-in event;

setting an internal flag that indicates that the user is outside of the user's geographic local area;

while the internal flag is set, caching the first current check-in entry and one or more subsequent current check-in entries in a cache so that the current check-in entries are not visible to the other users of the social network application; and identifying the set of fake check-in entries from a non-volatile storage area accessible from the social network application;

in response to the determination being that the entity's geographic identity is within the user's geographic local area:

checking the internal flag;

in response to the internal flag being set to indicate that the user is outside of the user's geographic local area:

sending a local check-in event to the social network application;

clearing the internal flag to indicate that the user is no longer outside the user's geographic local area;

retrieving the cached current check-in entries from the cache;

posting the retrieved cached current check-in entries, wherein the posted current check-in entries are visible by the other users of the social network application; and posting the first current check-in entry, wherein the posted current check-in entry is visible by the other users of the social network application; and in response to the internal flag being set to indicate that the user is within the user's geographic local area:

posting the first current check-in entry, wherein the posted first current check-in entry is visible by the other users of the social network application.

\* \* \* \* \*